United States Patent
Gracyalny

(10) Patent No.: US 6,615,787 B2
(45) Date of Patent: Sep. 9, 2003

(54) ENGINE STARTING AND STOPPING DEVICE

(75) Inventor: Gary J. Gracyalny, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 09/929,114

(22) Filed: Aug. 14, 2001

(65) Prior Publication Data

US 2002/0011227 A1 Jan. 31, 2002

Related U.S. Application Data

(63) Continuation-in-part of application No. 09/709,859, filed on Nov. 10, 2000, which is a continuation of application No. 09/183,425, filed on Oct. 30, 1998, now Pat. No. 6,230,678.

(51) Int. Cl.[7] .............................. F02N 1/00; F03G 1/00

(52) U.S. Cl. ................................. 123/185.14; 185/41 A

(58) Field of Search ......................... 123/185.14, 185.2, 123/185.3; 185/37, 39, 41 A; 74/7 C; 56/10.5

(56) References Cited

U.S. PATENT DOCUMENTS

| | | |
|---|---|---|
| 932,735 A | 8/1909 | Willard |
| 950,848 A | 3/1910 | Gardner |
| 1,009,503 A | 11/1911 | Goodhart |
| 1,022,087 A | 4/1912 | Jenney |
| 1,097,899 A | 5/1914 | Volkmar |
| 1,099,685 A | 6/1914 | Bennett |
| 1,137,358 A | 4/1915 | Sinclair |
| 1,249,775 A | * 12/1917 | Kramer .................. 74/141 |
| 1,394,619 A | 10/1921 | Hanson |
| 1,936,554 A | 11/1933 | Lansing |
| 2,293,322 A | 8/1942 | Veach |
| 2,922,411 A | 1/1960 | Skinner |
| 2,999,489 A | 9/1961 | Coughlin et al. |
| 3,139,877 A | 7/1964 | Graybill |
| 3,151,605 A | 10/1964 | Tillotson et al. |
| 3,165,100 A | 1/1965 | Svendsen |
| 3,290,871 A | 12/1966 | Haas |
| 3,301,243 A | 1/1967 | Lyvers |
| 3,324,842 A | 6/1967 | Haas |
| 3,375,814 A | 4/1968 | Hamman |

(List continued on next page.)

FOREIGN PATENT DOCUMENTS

| | | |
|---|---|---|
| DE | WO 98/57062 | 12/1998 |
| FR | 2639677 | 6/1990 |
| GB | 676850 | 8/1952 |
| JP | 62-53703 | 3/1983 |
| JP | 58051271 | 3/1983 |
| WO | WO98/57062 | 12/1998 |
| WO | WO00/26531 | 5/2000 |

OTHER PUBLICATIONS

16 CFR Sec. 1205.1 –1205.36, see specifically 16 CFR 1205(a) and (c), published prior to Oct. 30, 1997 by the Office of the Federal Register National Archives and Records Administration, United States of America.

Primary Examiner—Mahmoud Gimie
(74) Attorney, Agent, or Firm—Michael Best & Friedrich LLP

(57) ABSTRACT

An engine starting device includes a roller selectively engageable between the crankshaft of an engine and an arbor. The roller causes the arbor to rotate in a loading direction in response to rotation of the crankshaft. Rotation of the arbor loads an elastic member. A locking mechanism, such as a ratchet wheel and pawl may be used to keep the elastic member loaded until it is desired to startup the engine. Engine startup is initiated by disengaging the pawl from the ratchet wheel and permitting the elastic member to unload. A pinion gear is mounted on a helically threaded portion of the arbor and moves axially along the helically threaded portion in response to unloading of the elastic member. The pinion gear engages teeth on the flywheel and causes the flywheel to rotate in a starting direction under the influence of the unloading elastic member.

17 Claims, 3 Drawing Sheets

U.S. PATENT DOCUMENTS

| | | |
|---|---|---|
| 3,395,687 A | 8/1968 | Harkness |
| 3,447,523 A | 6/1969 | Bradbury et al. |
| 3,692,010 A | 9/1972 | Dooley et al. |
| 3,853,109 A | 12/1974 | Dooley |
| 3,861,374 A * | 1/1975 | Dooley et al. .......... 123/185.14 |
| 3,960,246 A | 6/1976 | Fisher |
| 4,067,243 A | 1/1978 | Kurata et al. |
| 4,096,842 A * | 6/1978 | Kurata ................. 123/185.14 |
| 4,104,927 A | 8/1978 | Jensen et al. |
| 4,176,648 A | 12/1979 | Gotoh et al. |
| 4,230,084 A | 10/1980 | Gotoh et al. |
| 4,363,298 A | 12/1982 | Kuhn |
| 4,441,466 A | 4/1984 | Tangorra |
| 5,086,890 A | 2/1992 | Turczyn et al. |
| 5,186,134 A | 2/1993 | Morishima et al. |
| 5,431,135 A | 7/1995 | Tyler |
| 5,537,966 A | 7/1996 | Ohnishi |
| 5,596,902 A | 1/1997 | McMillen |
| 5,970,940 A | 10/1999 | Penton |
| 6,230,678 B1 | 5/2001 | Gracyalny et al. |
| 6,325,036 B1 * | 12/2001 | Gracyalny et al. ..... 123/185.14 |

* cited by examiner

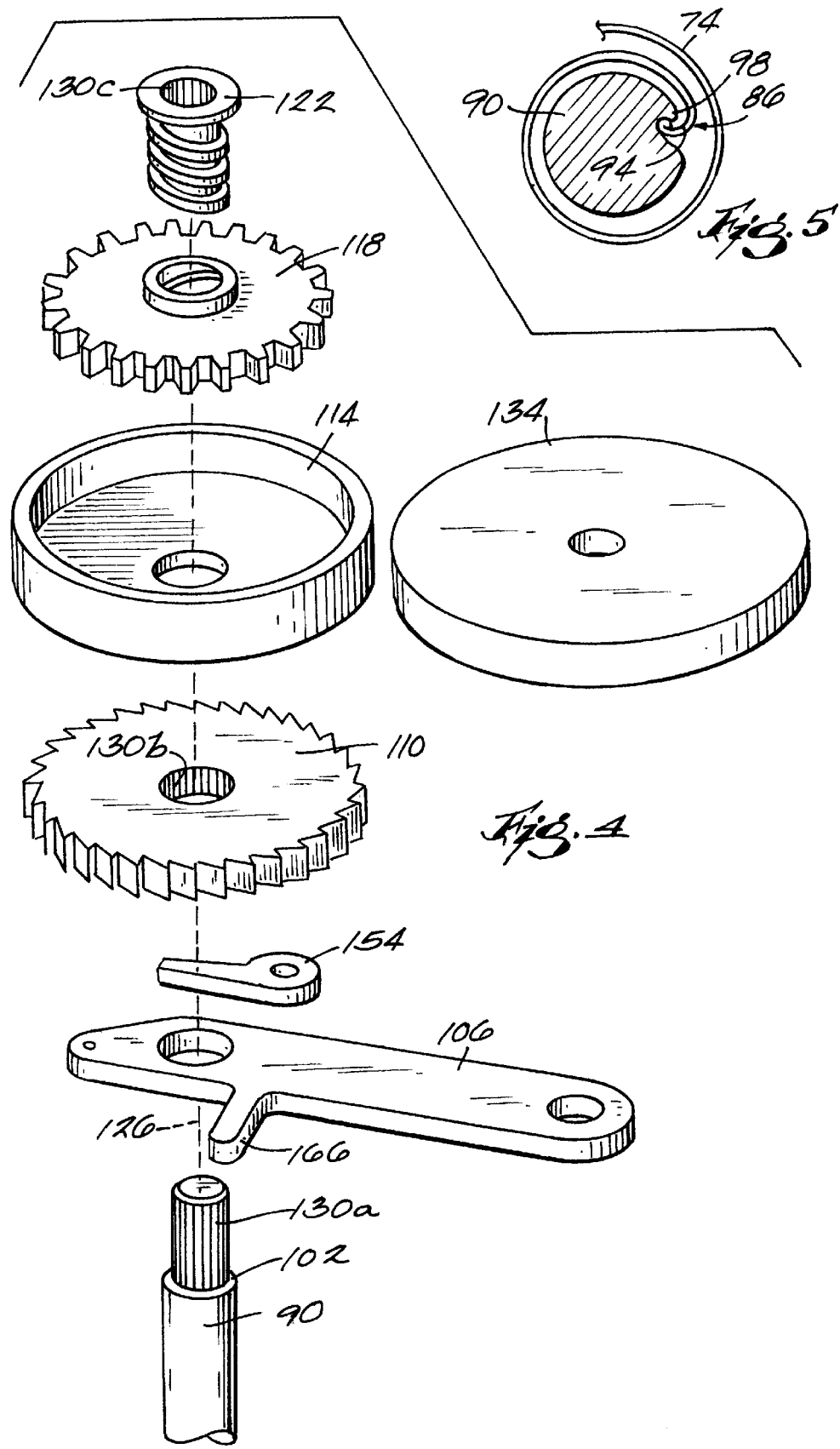

ENGINE STARTING AND STOPPING DEVICE

This application is a continuation-in-part of U.S. application Ser. No. 09/709,859 filed Nov. 10, 2000, which is a continuation of U.S. application Ser. No. 09/183,425 filed Oct. 30, 1998, now U.S. Pat. No. 6,230,678. The entire contents of both prior applications are incorporated herein by reference.

BACKGROUND

The invention relates to a starting and stopping device for an internal combustion engine. More specifically, the present invention relates to a mechanism for starting the engine by unloading stored power in an elastic member.

SUMMARY

The present invention provides an internal combustion engine including a spring loading mechanism, an engine starting mechanism, and an energy storing mechanism. The energy storing mechanism is mounted to the engine and includes at least one elastic member (e.g., a spring). An arbor is interconnected with the elastic member and rotates in a loading direction to load the elastic member and in an unloading direction in response to unloading of the elastic member.

The spring loading mechanism preferably includes a first roller mounted to the arbor. A second roller converts rotation of the engine's crankshaft into rotation of the arbor in the loading direction by selectively moving into engagement between the crankshaft and the second roller.

The engine starting mechanism includes a helically threaded member interconnected with the arbor and a starter pinion threaded onto the helically threaded member. Rotation of the arbor in the unloading direction causes the starter pinion to move along the helically threaded member and into engagement with the engine's flywheel. The starter pinion converts rotation of the arbor in the unloading direction into rotation of the flywheel in the starting direction to start the engine. The starter pinion may be a friction roller or a toothed gear.

The invention also includes a control system for releasing the spring from a loaded state to cause rotation of the arbor in the unloading direction. The control system may include one or more manual actuators, such as a bail handle and/or a push button interconnected with a locking mechanism. The locking mechanism may include a ratchet wheel and pawl assembly used to selectively prevent the elastic member from unloading. When actuated, the manual actuator releases the locking mechanism to initiate unloading of the elastic member.

Other features and advantages of the invention will become apparent to those skilled in the art upon review of the following detailed description, claims, and drawings.

BRIEF DESCRIPTION OF THE DRAWINGS

FIG. 4 is an exploded view of the spring housing assembly.

FIG. 5 is a cross-section view of the arbor and spring interconnection taken along line 5—5 in FIG. 2.

Figure 1:
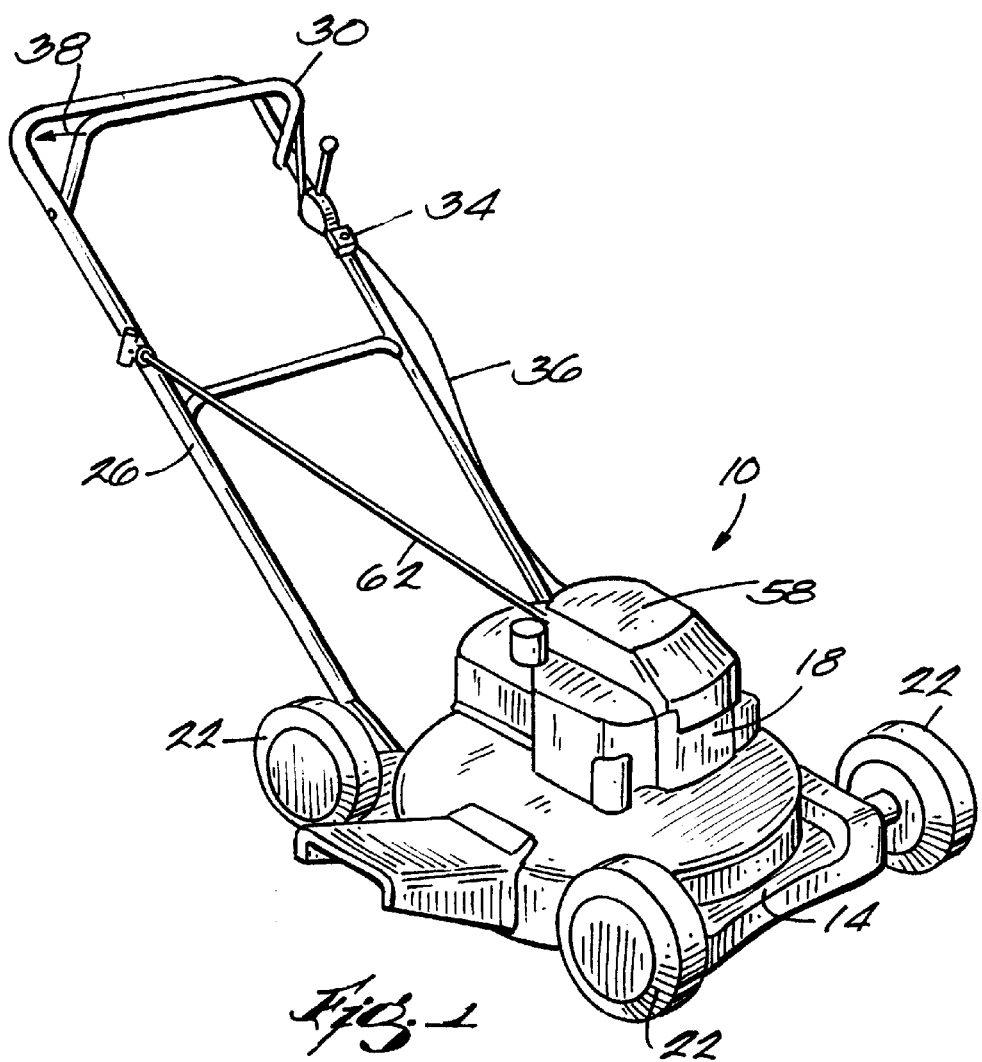
FIG. 1 is a perspective view of a lawnmower embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a lawnmower 10 comprising a deck 14, a blower housing or stationary housing 18, an engine 20 (FIG. 2) mounted to the deck 14 and supporting the stationary housing 18, a set of wheels 22 supporting the deck 14 above the ground, and a handle assembly 26 extending up from the deck 14. The lawnmower 10 also includes first and second manual actuators, which are a bail handle 30 and push button 34 in the illustrated embodiment, supported on the handle 26 at a location remote from the engine 20. The bail handle 30, or alternatively the push button 34, is operatively interconnected with mechanisms in the engine 20 by way of a cable. 36. As will be described below in more detail, the bail handle 30 and push button 34 must both be actuated in order to start up the engine 20. The bail handle 30, push button 34, and cable 36 are part of the control system of the engine 20. Alternatively, other types of manual actuators may be used, such as levers, knobs, removable keys, etc.

It should be noted that although the invention is illustrated as embodied in a lawnmower 10, the invention may be embodied in other devices powered by either a four-stroke or two-stroke cycle internal combustion engine. In some applications it may be desirable to have a two-step engine starting sequence. In other applications, it may be that only a single manual actuator, such as a push button or bail handle, is actuated to start the engine 20.

During operation of the lawnmower 10, the bail handle 30 must be moved to a start position 38 (FIG. 1) near the end of the handle assembly 26 to keep the engine 20 operating. The bail handle 30 is biased to move to a rest position (see FIG. 1) once let go by the operator. This causes the ignition circuit of the engine 20 to be grounded and shutdown of the engine 20 to be initiated. In order to move the bail handle 30 to the start position 38, the push button 34 must first be depressed and held while the bail handle 30 is moved. Depressing the push button 34 disengages a lock on the bail handle 30 or on another movable member in the engine starting mechanism (discussed in further detail below) that is required to start the engine 20. Alternatively, the bail handle 30 and push button 34 may be configured such that the bail handle 30 must first be moved to the start position 38 to enable the push button 34 to be actuated, in which case actuation of the push button 34 starts the engine 20.

Figure 2:
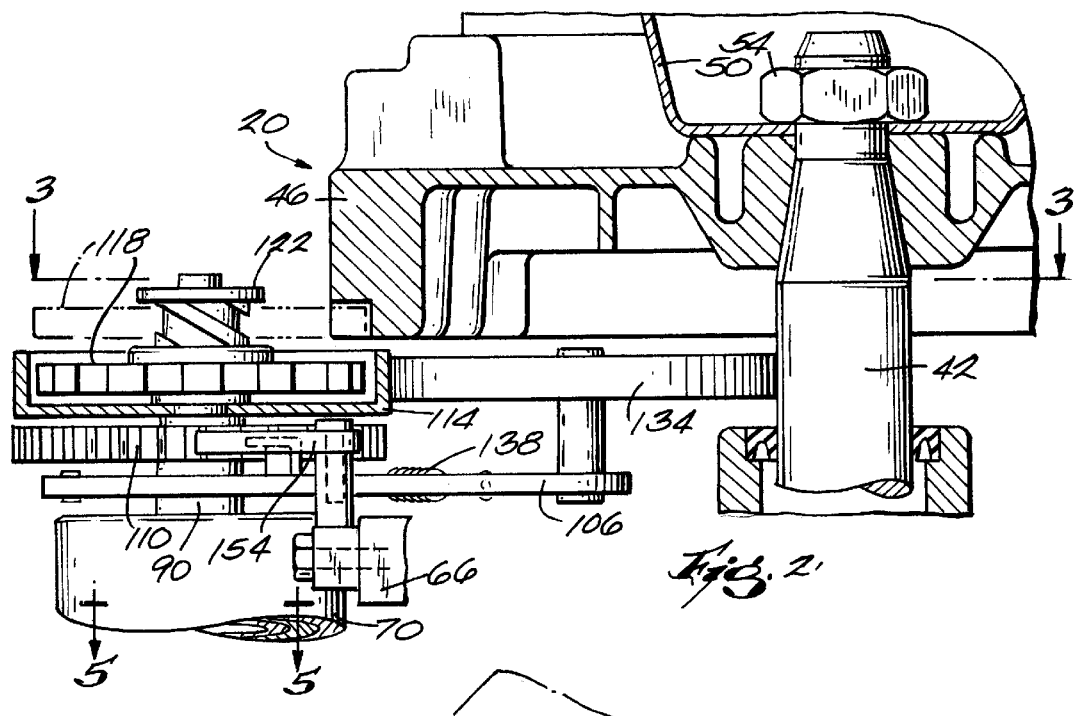
FIG. 2 is a cross-section view of a portion of the lawnmower illustrated in FIG. 1 illustrating a spring loading mechanism and an engine starting mechanism.

Turning now to FIG. 2, the engine 20 includes a crankshaft 42 that rotates in a known manner to drive a cutting blade positioned under the deck 14 of the lawnmower 10. The crankshaft 42 may be vertically-oriented as in the illustrated embodiment such that the cutting blade is attached directly to the lower end of the crankshaft 42. Alternatively, it can be oriented horizontally or non-vertically. Mounted to the top end of the crankshaft 42 are a flywheel 46 and a starter cup 50. A nut 54 may be threaded onto the end of the crankshaft 42 to secure the starter cup 50 and flywheel 46 to the top end of the crankshaft 42, as illustrated.

A conventional recoil starter assembly 58 (FIG. 1) is rotatably mounted to the stationary housing 18 above the flywheel 46, crankshaft 42, and starter cup 50. The recoil starter 58 includes dogs that engage the starter cup 50 to rotate the crankshaft 42 when a starter rope 62 (FIG. 1) is pulled. The engine 20 may be started in a conventional manner by pulling on the starter rope 62.

Mounted on the side of the engine 20 (e.g., to an engine housing 66 or crankcase) is a mounting bracket 68. A spring housing 70 is fixed with respect to the mounting bracket 68 and the engine housing 66 to prevent relative movement therebetween. As seen in FIG. 5, an elastic member or spring 74, such as a coil of spring steel, is housed within the spring housing 70. The outer end of the spring 74 is fixed to the spring housing 70, and the inner end 86 of the spring 74 is releasably attached to an arbor 90 by way of a hook 94 (described by the inner end 86 of the spring 74) and an eyelet 98 (formed in the side of the arbor 90). The arbor 90 is supported for rotation within, and rotates with respect to, the spring housing 70.

As seen in FIG. 4, the arbor includes a shoulder 102 on which is supported a pivotable bracket or arm 106, a ratchet wheel 110, a spring loading cup 114, a pinion gear 118, and a helically threaded member 122. The ratchet wheel 110 and helically threaded member 122 are fixed for rotation with the arbor 90 by way of a key, splines (as illustrated at 130a, 130b, and 130c), or the like. The pinion gear 118 is threaded onto the helically threaded member 122 and is received within the cavity of the cup 114. Although the cup 114 is shaped as illustrated to save space by at least partially receiving the pinion gear 118 therein, the cup 114 could alternatively be a solid disk or roller.

An overwind clutch (not illustrated) couples the spring loading cup 114 and arbor 90 for rotation together. When a torsional threshold is reached, the overwind clutch slips, and permits the spring loading cup 114 to rotate about the arbor 90 to protect the spring 74 from overwinding.

Figure 3:
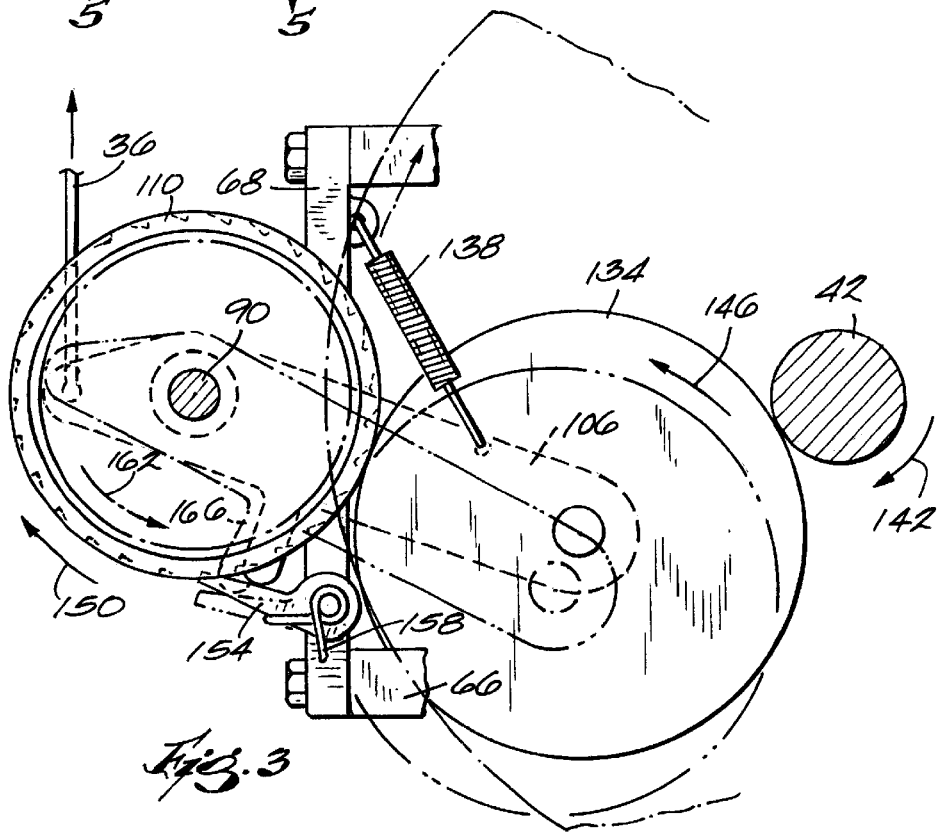
FIG. 3 is a view taken along line 3—3 in FIG. 2.

FIGS. 2 and 3 illustrate a spring loading mechanism which includes the spring loading cup 114 and a roller 134 supported for rotation on the pivotable arm 106. In the illustrated construction, the pivotable arm 106 pivots about the longitudinal axis 126 of the arbor 90 between a loading or engaged position (shown in solid lines in FIG. 3) and a starting or disengaged position (shown in phantom in FIG. 3). When in the loading position, the arm 106 wedges the roller 134 into engagement between the crankshaft 42 and the spring loading cup 114. When in the starting position, the arm 106 moves the roller 134 clear of engagement of the crankshaft 42.

Because the arm 106 pivots about the longitudinal axis 126 of the arbor 90, the roller 134 is in constant contact with the spring loading cup 114. Alternatively, the pivotable arm 106 may be pivotably mounted to the bracket 68 or about an eccentric bearing surrounding the arbor 90 such that the pivot axis of the arm 106 is non-coaxial with the longitudinal axis 126. If the pivot axis of the arm 106 is non-coaxial with the longitudinal axis 126, the roller 134 disengages both the crankshaft 42 and the spring housing 114 when the arm 106 is moved to the starting position.

The diameter of the roller 134 is larger than the distance between the crankshaft 42 and the spring loading cup 114 so that the roller 134 cannot pass between the crankshaft 42 and the spring loading cup 114. A return spring 138 biases the pivotable arm 106 toward the loading position. The cable 36 interconnects the pivotable arm 106 with the bail handle 30 such that moving the bail handle 30 into the starting and operating position moves the pivotable arm 106 into the starting position.

The operation of the spring loading mechanism will now be described. During ordinary operation of the engine 20, the crankshaft 42 and flywheel 46 rotate in a starting or operating direction 142 (FIG. 3), which is clockwise in the illustrated embodiment. When the bail handle 30 is released (i.e., to initiate engine shutdown and flywheel coastdown), the return spring 138 causes the pivotable arm 106 to move into the loading position. The pivotable arm 106 may contact a grounding switch of the engine's ignition circuit when the arm 106 is in the loading position. Thus, the spring loading mechanism may substantially simultaneously initiate engine shutdown and spring loading.

The roller 134 rotates in the counterclockwise direction 146 and causes the spring loading cup 114 to rotate in a loading direction 150. The loading direction 150 is the same as the starting direction 142 (clockwise) in the illustrated embodiment. The arbor 90 and ratchet wheel 110 rotate in the loading direction 150 with the spring loading cup 114 due to the overwind clutch. With reference to FIG. 5, the hook and eyelet 94, 98 interconnection between the arbor 90 and spring 74 causes the spring 74 to be loaded in response to rotation of the arbor 90 in the loading direction 150.

A pawl 154 is pivotably mounted on the bracket 68, and is biased toward the ratchet wheel 110 with a torsional spring 158. The ratchet wheel 110 and pawl 154 act as a locking mechanism that prevents the spring 74 from unloading. The pawl 154 permits rotation of the ratchet wheel 110 in the loading direction 150, but not in an unloading direction 162 (i.e., counterclockwise or opposite the loading direction 150 as illustrated in FIG. 3).

As the spring 74 is loaded, it creates increasing resistance to further rotation of the crankshaft 42 in the starting direction 142, and therefore has a braking effect on the crankshaft 42. Should the flywheel 46 and crankshaft 42 continue rotating after the spring 74 has reached a predetermined load or torsional threshold, the overwind clutch will slip, thereby protecting the spring 74 from overloading.

The overwind clutch is therefore a means for reducing the incidence of damage to the spring 74 due to overwinding. In this regard, the overwind clutch can be mounted anywhere provided it is operatively positioned between the crankshaft 42 and the spring 74. That is to say that the overwind clutch must be able to uncouple the crankshaft 42 from the spring 74 so that loading of the spring 74 is stopped at the desired threshold even if the crankshaft 42 is still rotating.

Although the above-described spring loading system contemplates loading the spring 74 during engine coastdown, the pivotable arm 106 may be actuated manually or automatically to load the spring 74 during normal operation of the engine 20 and without causing or initiating engine shutdown.

FIGS. 2 and 4 illustrate a spring unloading or engine starting mechanism that causes startup of the engine 20. The unloading mechanism includes the helically threaded member 122, the pinion gear 118, and a tab 166 interconnected or formed integrally with the pivotable arm 106. When the bail handle 30 is moved to the start position 38, the cable 36 pivots the pivotable arm 106 to the spring unloading position. This movement causes the tab 166 on the pivotable arm 106 to abut the pawl 154 and disengage it from the ratchet wheel 110. The spring 74 is unloaded in response to the pawl 154 disengaging the ratchet wheel 110. It should be noted that in other embodiments the push button 34 or another manual actuator can be used to actuate the pivotable arm 106.

As the spring 74 unloads, the arbor 90 is rotated in the unloading direction 162 (FIG. 3), which causes the pinion gear 118 to climb up the helically threaded member 122 along the axis of rotation 126 of the arbor 90. As the pinion gear 118 approaches or reaches the top of the helically threaded member 122, the teeth of the pinion gear 118 mesh with teeth formed integrally with the flywheel 46. Rotation of the pinion gear 118 in the unloading direction 162 causes the flywheel 46 to rotate in the starting direction 142, thereby causing startup of the engine 20.

Once the engine 20 is started, the flywheel 46 overruns the pinion gear 118 and causes the pinion gear 118 to rotate back down the helically threaded member 122. It should be noted that the gear teeth associated with the flywheel 46 may be provided by a ring gear mounted to the flywheel 46 as an alternative to being integrally formed with the flywheel 46. In alternative embodiments the starter pinion 118 may include a friction roller that engages the flywheel 46 by way of frictional forces.

Turning again to FIG. 5, once the spring 74 is substantially unloaded, the hook 94 at the inner end 86 slips or slides out of the eyelet 98 in the rotating arbor 90 to reduce the likelihood of the spring 74 being damaged by bending back on itself at the inner end 86. The hook 94 and eyelet 98 therefore function as an integrally-formed one-way clutch in the sense that the hook 94 and eyelet 98 are integrally formed with the spring 74 and arbor 90, respectively. Alternative forms of one-way clutches (not shown), such as one-way bearings and pivotable or flexible dogs, may be used in place of the hook 94 and eyelet 98 to interconnect the spring inner end with the arbor 90.

What is claimed is:

1. An internal combustion engine comprising:
   an engine housing;
   a crankshaft mounted for rotation within said engine housing;
   a flywheel mounted to said crankshaft for rotation therewith in a starting direction during startup and operation of said engine;
   a spring housing mounted to said engine housing such that there is substantially no relative rotation between said engine housing and said spring housing;
   an energy storing mechanism including at least one elastic member housed within said spring housing, said elastic member having a portion fixed to said spring housing;
   an arbor extending into said spring housing and interconnected with a portion of said elastic member such that rotation of said arbor in a loading direction causes said elastic member to become loaded, said arbor rotating in an unloading direction in response to unloading of said elastic member;
   a spring loading mechanism including a first roller interconnected with said arbor for rotation therewith, and a second roller selectively engageable with both said crankshaft and said first roller to cause rotation of said arbor in said loading direction in response to rotation of said crankshaft in said starting direction such that said elastic member is loaded in response to rotation of said crankshaft in said starting direction; and
   a starting mechanism movable in response to unloading of said elastic member to cause engine startup.

2. The engine of claim 1, wherein said starting mechanism includes a starter pinion rotating in response to rotation of said arbor and selectively engageable with said flywheel to convert rotation of said arbor in said unloading direction into rotation of said flywheel in said starting direction to start said engine.

3. The engine of claim 2, wherein said starting mechanism further includes a helically threaded member interconnected with said arbor and rotatable about an axis of rotation, wherein said starter pinion is threaded onto said helically threaded member, and wherein rotation of said arbor in said unloading direction causes said helically threaded member to rotate about said axis of rotation to cause said starter pinion to move axially along said helically threaded member and into engagement with said flywheel.

4. The engine of claim 3, wherein said helically threaded member is mounted directly onto said arbor, and wherein said axis of rotation of said helically threaded member is substantially collinear with an axis of rotation of said arbor.

5. The engine of claim 2, wherein said starter pinion includes a friction roller selectively engaging a friction surface of said flywheel.

6. The engine of claim 2, wherein said flywheel has gear teeth interconnected therewith, and wherein said starter pinion includes gear teeth selectively meshing with said flywheel gear teeth.

7. The engine of claim 1, further comprising a control system for releasing said elastic member from a loaded state to cause rotation of said arbor in said unloading direction.

8. The engine of claim 7, wherein said control system includes at least one manual actuator remotely located with respect to said engine and actuable to release said elastic member from said loaded state.

9. The engine of claim 8, wherein said at least one manual actuator includes a first manual actuator remotely located with respect to said engine, and a second manual actuator, wherein said first and second manual actuators must both be actuated to release said elastic member from said loaded state.

10. The engine of claim 7, wherein said second roller is biased toward engagement with both said crankshaft and said first roller, and wherein said second roller is movable out of engagement with at least one of said crankshaft and first roller in response to actuation of a said control mechanism.

11. The engine of claim 1, wherein said spring loading mechanism further includes a pivotal arm, wherein said second roller is rotatably mounted to said arm, and wherein said arm is selectively pivotable to move said second roller into and out of engagement between said crankshaft and first roller.

12. The engine of claim 11, further comprising a locking mechanism for preventing said elastic member from unloading during loading of said elastic member, said locking mechanism including a ratchet wheel interconnected with said arbor and a pawl interconnected with said engine housing, wherein a portion of said pivotable arm removes said ratchet from engagement with said ratchet wheel substantially simultaneously with moving said second roller out of engagement between said crankshaft and first roller.

13. The engine of claim 1, further comprising a locking mechanism for preventing said elastic member from unloading during loading of said elastic member.

14. The engine of claim 13, wherein said locking mechanism includes a ratchet wheel interconnected with said arbor and a pawl interconnected with said engine housing, said pawl being selectively disengageable from said ratchet wheel to initiate startup of said engine.

15. The engine of claim 1, wherein said elastic member and said arbor are releasably coupled to each other by way of a one-way clutch.

16. The engine of claim 15, wherein said one-way clutch includes a hook on said elastic member releasably engaging an eyelet on said arbor in response to said arbor rotating in said loading direction, said hook disengaging said eyelet in response to said elastic member becoming substantially unloaded.

17. The engine of claim 1, further comprising an engine shutdown mechanism initiating engine shutdown substantially simultaneously with said spring loading mechanism initiating loading of said elastic member.

* * * * *